US008718475B2

(12) United States Patent
Skoog et al.

(10) Patent No.: US 8,718,475 B2
(45) Date of Patent: May 6, 2014

(54) TRANSPONDER POOL SIZING IN HIGHLY DYNAMIC TRANSLUCENT WDM OPTICAL NETWORKS

(75) Inventors: Ronald A. Skoog, Bend, OR (US); Brian J. Wilson, Rumson, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 546 days.

(21) Appl. No.: 13/049,173

(22) Filed: Mar. 16, 2011

(65) Prior Publication Data

US 2012/0106966 A1 May 3, 2012

Related U.S. Application Data

(60) Provisional application No. 61/315,413, filed on Mar. 19, 2010.

(51) Int. Cl.
*H04J 14/02* (2006.01)

(52) U.S. Cl.
USPC .......... 398/83; 398/43; 398/48; 398/79; 398/91; 398/97; 398/173; 398/180

(58) Field of Classification Search
None
See application file for complete search history.

(56) References Cited

U.S. PATENT DOCUMENTS

2006/0083295 A1* 4/2006 Ahmed et al. ................. 375/222
2010/0014859 A1* 1/2010 D'Alessandro et al. ........ 398/48

OTHER PUBLICATIONS

Yang et al: "Dynamic routing in translucent WDM optical networks", 2005, IEEE JLT, 23(3), pp. 955-971.*
Chu et al: "Wavelength converter placement under different RWA algorithms in wavelength-routed all-optical networks", IEEE Trans. Comm., 2003, 51 (4), pp. 607-617.*
Hei et al, "Wavelength converter placement in least-load-routing-based optical networks using genetic algorithms," 2004 JON, 3(5), pp. 363-378.*
S. Subramaniam, M. Azizoglu, A. Somani, "On Optimal Converter Placement in Wavelength-Routed Networks," IEEE/ACM Trans. on Networking, vol. 7, No. 5, Oct. 1999, pp. 754-766.
A.S. Arora, S. Subramaniam, "Converter Placement in Wavelength Routing Mesh Topologies," Proc. IEEE ICC, Jun. 2000, pp. 1282-1288.
S. Gao, X. Jia, C. Huang, D. Du, "An Optimization Model for Placement of Wavelength Converters to Minimize Blocking Probability in WDM Networks," IEEE Journal of Lightwave Tech., vol. 21, No. 3, pp. 684-694, Mar. 2003.
X. Chu, B. Li, I. Chalamtac, "Wavelength Converter Placement Under Different RWA Algorithms in Wavelength-Routed All-Optical Networks," IEEE Trans. on Communications, vol. 51, No. 4, pp. 607-617, Apr. 2003.

(Continued)

*Primary Examiner* — Li Liu
(74) *Attorney, Agent, or Firm* — Philip J. Feig

(57) ABSTRACT

A system and method for sizing transponder pools in a dynamic wavelength division multiplexing optical network having selected nodes designated to have a shared transponder pool is presented. The method comprises performing network simulations, generating transponder pool histograms (for each node having a transponder pool) based on the network simulations, performing statistical analysis using the transponder pool histograms to determine probability distribution and distribution parameters for each node and to calculate the horizontal axis location that has a specified distribution tail area, sizing the transponder pools according to the horizontal axis location that has the desired distribution tail area, executing network call blocking simulations to calculate call blocking probabilities, determining whether the call blocking probabilities meet blocking requirements, when the blocking requirements are met, using the sized transponder pools, and when the blocking requirements are not met, adjusting the distribution tail area and repeating sizing, executing and determining steps.

15 Claims, 6 Drawing Sheets

(56) References Cited

OTHER PUBLICATIONS

X. Yang, B. Ramamurthy, "Dynamic Routing in Translucent WDM Optical Networks: The Intradomain Case," IEEE Journal of Lightwave Tech., vol. 23, No. 3, pp. 955-971, Mar. 2005.

T. De, A. K. Pathak, A. Pal, "An Efficient Heuristic-based Algorithm for Wavelength Converter Placement in All-Optical Networks," Proc. of 2007 IEEE Int'l Conf. on Telecom and Malaysia Conf. on Comm., May 14-17, 2007, Penang Malaysia, pp. 186-190.

X. Hei, J. Zhang, B. Bensaou, C. Cheung, "Wavelength Converter Placement in Least-load-routing-based Optical Networks using Genetic Algorithms," Journal of Optical Networking, OSA, vol. 3, No. 5, pp. 363-378, May 2004.

X. Chu, J. Liu, Z. Zhang, "Analysis of Sparse-Partial Wavelength Conversion in Wavelength-Routed WDM Networks," IEEE INFOCOM 2004, vol. 2, pp. 1363-1371, Mar. 2004.

A. Soares, P. Cunha, J. Maranhao, W. Giozza, "Wavelength Converter Placement Scheme for Optical Network with Sparse-Partial Wavelength Conversion Capability," 13th International Conference on Telecommunications-ICT, May 2006.

* cited by examiner

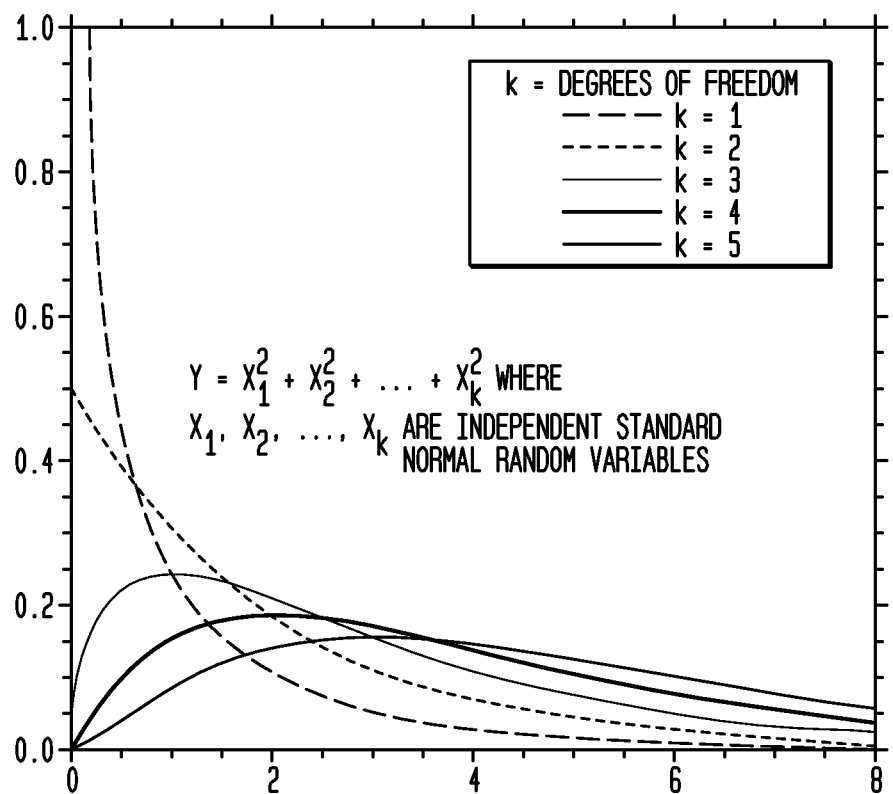

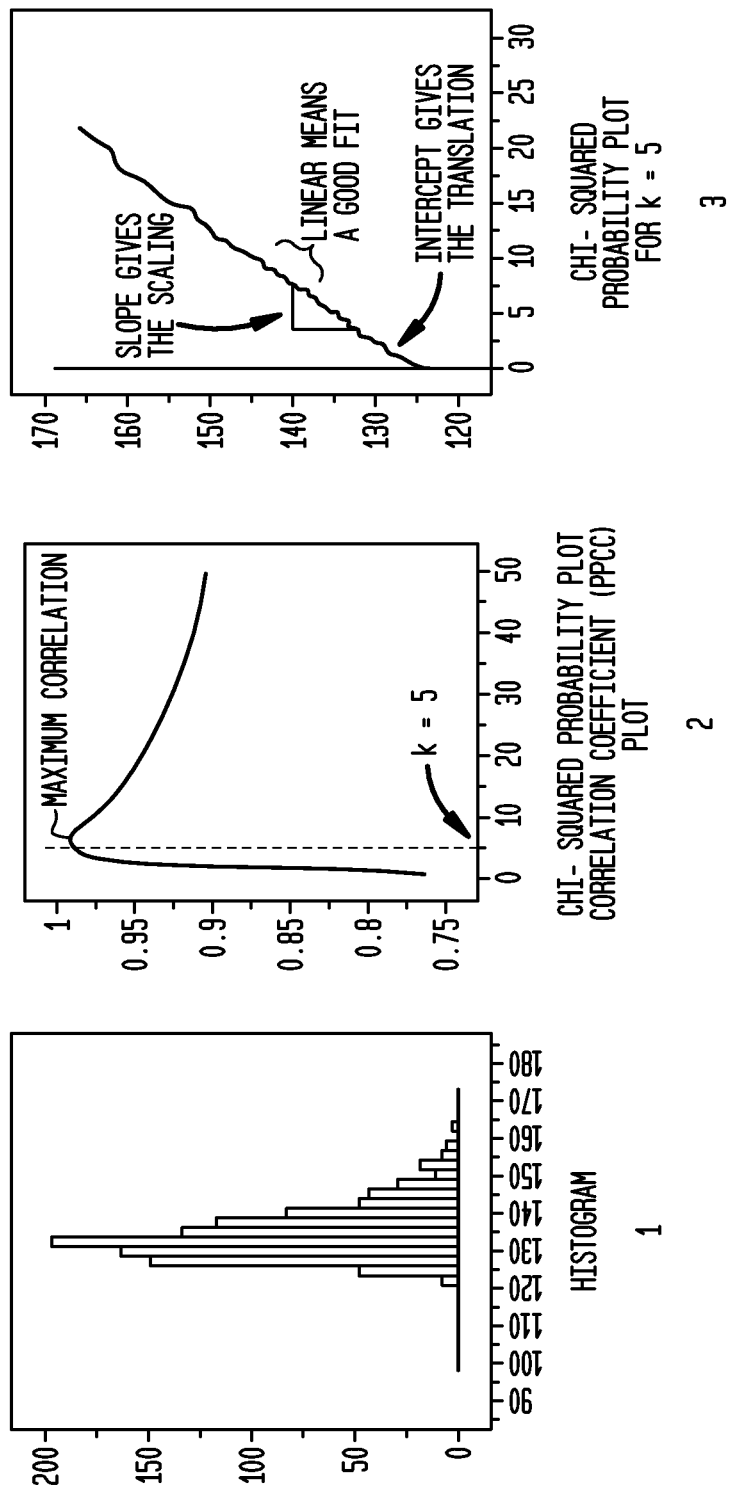

FIG. 6
SIZING TxRx POOLS AND CHI-SQUARED TAIL AREA CHARACTERISTICS $\Delta$ MEASURED IN UNITS OF STANDARD DEVIATION $\sigma$

| k | $\Delta$ |
|---|---|
| 1 | 9.9 |
| 2 | 8.25 |
| 3 | 7.35 |
| 4 | 6.89 |
| 5 | 6.58 |
| 6 | 6.36 |
| 8 | 5.95 |
| 9 | 5.77 |
| 10 | 5.7 |
| 11 | 5.65 |

WE SIZED THE TxRx POOLS SO THE DISTRIBUTION TAIL AREA BEYOND THE POOL SIZE (MEAN + $\Delta$) IS $10^{-4}$

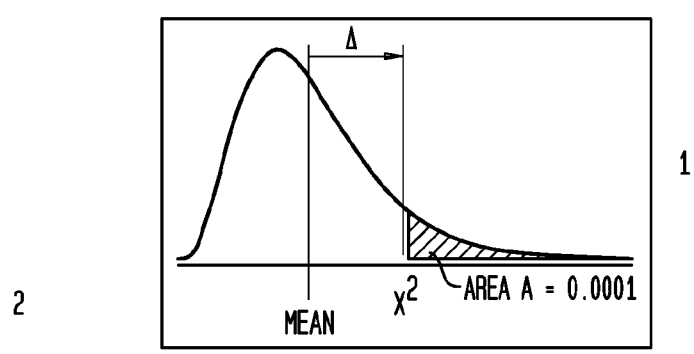

AREA A = 0.0001

THE VALUE OF $\Delta$ (IN UNITS OF $\sigma$) VARIES CONSIDERABLY WITH THE DEGREES OF FREEDOM k THUS, IT IS CRITICAL TO KNOW THE NODE HISTOGRAM'S MEAN, VARIANCE AND THE DEGREES OF FREEDOM TO ESTIMATE $\Delta$ k = DEGREES OF FREEDOM
$\sigma$ = STANDARD DEVIATION

TRANSPONDER POOL SIZING IN HIGHLY DYNAMIC TRANSLUCENT WDM OPTICAL NETWORKS

CROSS REFERENCE TO RELATED APPLICATIONS

The present invention claims the benefit of U.S. provisional patent application 61/315,413 filed Mar. 19, 2010, the entire contents and disclosure of which are incorporated herein by reference as if fully set forth herein.

FIELD OF THE INVENTION

This invention relates to capacity planning for Wavelength Division Multiplexing optical networks and in particular systems and methods for sizing optical network transponder pools.

BACKGROUND OF THE INVENTION

In an optical Wavelength Division Multiplexing (WDM) network, transponders (TxRx) are required to convert signals from the electrical domain to the optical domain (and vice versa) for transmission over optical fiber on a specific WDM wavelength. This function, i.e., electrical to optical and optical to electrical conversion, is required at the nodes where a connection is added and dropped from the WDM network, and at intermediate nodes in the connection where the wavelength must be changed (wavelength conversion) or the signal must be regenerated (to compensate for losses and distortions that occur in the optical transmission over a distance). In a dynamic network, connection requests (i.e., calls) for an optical channel between two nodes arrive and hold the connection for some time and then the connection (call) is torn down. Thus, transponders are only required for a particular dynamic connection for the length of the call. An efficient way to build such dynamic optical networks is to have shared pools of transponders at the nodes where optical connections originate/terminate and at some additional nodes where just wavelength conversion or regeneration is done. When a connection request arrives, as part of the connection setup process, the connection is allocated the transponders it needs from the shared pools, and when the connection is done and disconnected, it returns the allocated transponders to the shared pools. In a dynamic network the shared transponder pools must be provisioned in the switches ahead of time, so when calls for optical connections arrive the needed transponders for a connection are immediately available. The transponder pools are sized to meet a desired call blocking probability (e.g., a typical over-all call blocking probability objective is $10^{-3}$ and the blocking probability objective from a lack of needed transponders would be $10^{-4}$).

In previous work, small networks (e.g., NSFNET which has 14 nodes) and a small number (<10) of transponders are used in any node. These methodologies do not scale well to large networks (e.g., 100 nodes) with significant traffic loads that would occur in a telecommunications carrier network (e.g., total network load of many terabits per second). In the realistic carrier scale networks, on the order of forty to fifty transponders are required in the larger nodes and two thousand to three thousand transponders are required network-wide. Networks of this scale would overwhelm the algorithmic techniques used in previous research regarding small networks.

In other previous work, network simulations that assume an unlimited number of transponders are available at each node have been performed, and information from those simulations is used to size the transponder pools. The methodology assumes that some number, M, of transponders are available for use and the simulation data is used to determine how to distribute the M transponders. For example, in one approach, the simulations provide a distribution for each node of the number of transponders in use at a random point in time. From those distributions, the average and peak value for each node is determined, and the M transponders are distributed in proportion to either the average or peak values. However, there is no relationship between this method of distributing M transponders and the call blocking probability that would result.

In another approach, unlimited transponders are assumed at each node and some amount of traffic load distribution between node-pairs is also assumed. The load distribution is scaled in incremental steps from low to higher values. At each load step, a "long" simulation is run to determine the maximum number of transponders used at each node (this is called a "high water mark"). This process continues until the sum of the node high water marks equals M, and then that set of high water marks is used for the transponder pool sizes. The load level at this point is called First Load (FL), and it corresponds with the maximum traffic load that can be submitted to the network with M distributed transponders and have blocking performance identical to a network with unlimited transponders in all nodes.

The problem with these previous methods is that they do not explicitly address the desired blocking requirements, and the network could be significantly over provisioned with expensive transponders. Our studies have shown that designs based on simulation "high water marks" are very conservative and significantly over provision the network.

Another problem with previous methods is that they do not consider the sharing of wavelength conversion and regeneration transponders with the transponders used for the add/drop function. It is well known that having a single resource pool serving multiple traffic streams is more efficient than having a separate pool for each individual traffic stream.

SUMMARY OF THE INVENTION

An inventive system and method for sizing shared transponder pools to meet call blocking requirements is presented. Given a forecast of a network's future dynamic wavelength connection load in the form of a Traffic Intensity Matrix (TIM), and once it has been decided what nodes will have shared transponder pools, the novel system and method sizes the transponder pools so that connection call blocking requirements are met and the total number of transponders required is minimized. The TIM provides the forecasted dynamic traffic load between each node pair in the network.

The invention described here would be a software system used in a network service provider's network planning process. Typically, a network service provider will conduct network planning studies at regular intervals (e.g., every 6 months) to determine what additional equipment (transponders, optical fibers, optical amplifiers, switch frames, line cards, etc.) will need to be installed to meet future demand growth. These network planning studies are driven by network load forecasts that the service provider develops from a variety of sources. Part of this planning process for optical networks involves the forecasting of the number of transponders that will be needed in the various optical switch locations in their network. The invention being described here would be a software system that would be used in developing the forecast of the number of transponders required in each of the optical switch locations that support transponder pools.

The inventive system for sizing one or more transponder pools in a dynamic wavelength division multiplexing optical network having a plurality of nodes, each transponder pool associated with an associated node of the network, comprises a CPU performing network simulations and a module operable to generate transponder pool histograms for each associated node based on the network simulations, to perform statistical analysis using the transponder pool histograms to verify probability distribution is from Chi-Squared family, to determine probability distribution parameters for each associated node and to calculate where, on the horizontal axis of the probability distribution, a tail area of a desired blocking starts, to size the transponder pools in accordance with where the desired distribution tail area starts, to execute network call blocking simulations to determine call blocking probabilities, and to determine whether the call blocking probabilities meet blocking requirements, wherein when the blocking requirements are met, using the sized transponder pools and when the blocking requirements are not met, adjusting where the desired distribution tail area starts and repeating the steps of sizing the transponder pools, executing the network call blocking simulations and determining whether the call blocking probabilities meet the blocking requirements.

In one aspect, the distribution parameters comprise mean, variance and Chi-Squared degrees of freedom. In one aspect, the network simulations are performed using a plurality of separate simulation runs performed with different simulation seeds. In one aspect, performing network simulations comprises one or more of simulation of optical connection call arrivals/departures, routing of optical connections, determining wavelengths, determining wavelength converters, and determining regeneration. In one aspect, the transponder pools comprise a number of transponders enabling the transponder pool to have at least one transponder during any simulation, the number depending at least on network design and network load. The number of transponders can also depend on other parameters.

The inventive method for sizing one or more transponder pools in a dynamic wavelength division multiplexing optical network having a plurality of nodes, each transponder pool associated with an associated node of the network, comprises steps of performing network simulations, generating transponder pool histograms for each associated node based on the network simulations, performing statistical analysis using the transponder pool histograms to verify probability distribution is from Chi-Squared family, to determine probability distribution parameters for each associated node and to calculate where, on the horizontal axis of the probability distribution, a tail area of a desired blocking starts, sizing the transponder pools in accordance with where the desired distribution tail area starts (or where on the horizontal axis the distribution tail area is a desired blocking value, e.g., $10^{-4}$), executing network call blocking simulations to determine call blocking probabilities, determining whether the call blocking probabilities meet blocking requirements, when the blocking requirements are met, using the sized transponder pools, and when the blocking requirements are not met, adjusting where the desired distribution tail area starts and repeating the steps of sizing the transponder pools, executing the network call blocking simulations and determining whether the call blocking probabilities meet the blocking requirements.

In one aspect, the distribution parameters comprise mean, variance and Chi-Squared degrees of freedom. In one aspect, the step of performing network simulations is done by performing a plurality of separate simulation runs performed with different simulation seeds. In one aspect, the step of performing network simulations comprises one or more of simulation of optical connection call arrivals/departures, routing of optical connections, determining wavelengths, determining wavelength converters, and determining regeneration. In one aspect, the transponder pools comprise a number of transponders enabling the transponder pool to have at least one transponder during any simulation, the number depending at least on network design and network load. The number of transponders can also depend on other parameters.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 4 illustrates a Chi-Squared distribution family.

FIG. 5 illustrates statistical analysis in accordance with the present invention.

FIG. 6 illustrates sizing transponder pools using Chi-Squared tail area characteristics.

DETAILED DESCRIPTION

An inventive system and method for transponder pool sizing in dynamic WDM optical networks is presented. The novel technology focuses on meeting call blocking objectives and providing a methodical process for sizing shared transponder pools to meet those blocking objectives.

Figure 1:
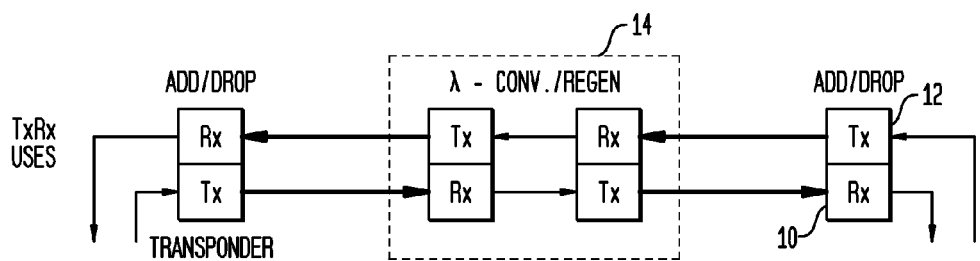
FIG. 1 illustrates the use of transponders in an optical network.

FIG. 1 illustrates the three ways (add/drop, wavelength conversion, and regeneration) that transponders are used in an optical network. FIG. 1 illustrates the add/drop function wherein a transmit function (Tx) 10 converts an electrical signal to an optical signal (EO) for transmission over optical fiber, and a receive function (Rx) 12 converts an optical signal to an electrical signal (OE) for processing and further transmission to the client. The combined TxRx functions 10, 12 are called a transponder, and constitute a single optical networking device.

The center item 14 in FIG. 1, "ë-conv./Regen", illustrates wavelength conversion and/or regeneration using two transponders. Wavelength conversion, as the name implies, changes the optical wavelength used in one fiber to a different wavelength used in another fiber. This function is required when setting up a connection and it is desired to use a particular fiber path but the same wavelengths are not available in two adjacent fibers. Regeneration is required when optical impairments cause too much distortion in the optical signal, and it needs to be regenerated before it can be optically transmitted further. FIG. 1 shows an optical wavelength traveling from a Tx 10, along one fiber, into an Rx in 14. From that Rx there is an electrical connection to a Tx in 14. In that Tx of 14, the optical signal is regenerated and the wavelength can be converted if necessary and then the optical signal travels to the next Rx.

Figure 2:
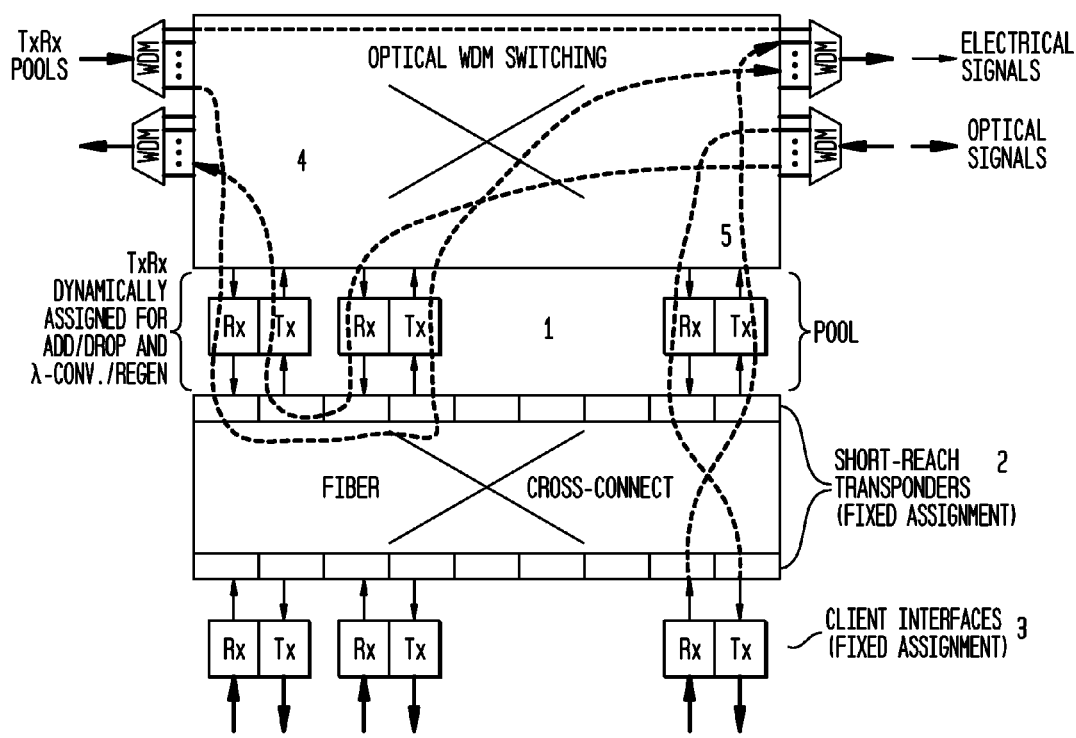
FIG. 2 illustrates a shared pool of transponders (the transponders are shared across add/drop, wavelength conversion and optical signal regeneration functionality) in an optical switch.

FIG. 2 illustrates how a pool of transponders in an optical switch can be shared between the wavelength conversion, regeneration and add/drop functionalities. Item 1 in FIG. 2 illustrates the shared pool of WDM transponders in an optical switch. The WDM transponders have optical transmit and receive connections to the Optical WDM Switching fabric and electrical connections to short-reach transponders connected to a fiber cross-connect. Three transponders or TxRx pairs are shown in the optical switch in FIG. 2 but any number of transponders can be used.

In FIG. 2, Item 2 shows short-reach transponders used to connect the fiber cross-connect to the WDM transponders and to the client transponder interfaces shown as Item 3. Item 4 illustrates how wavelength conversion/regeneration is carried out in the switch. For example, the wavelength from the top WDM demultiplexer travels to the Rx in one TxRx through the fiber cross-connect to another TxRx and then the wavelength continues through the WDM switch and exits through the WDM multiplexer on the right side of the switch. Item 5 illustrates how the add/drop functionality is implemented. In the embodiment shown in FIG. 2, add/drop is implemented by the wavelength traveling through the client interfaces (fixed assignment) of Item 3; the outgoing wavelength travels into the fiber cross-connect and into the Tx of the WDM TxRx, and then through the WDM switch into the outgoing fiber. The incoming wavelength goes through the WDM switch to the WDM TxRx, and then goes through the fiber cross-connect to the client interface TxRx.

Figure 3:
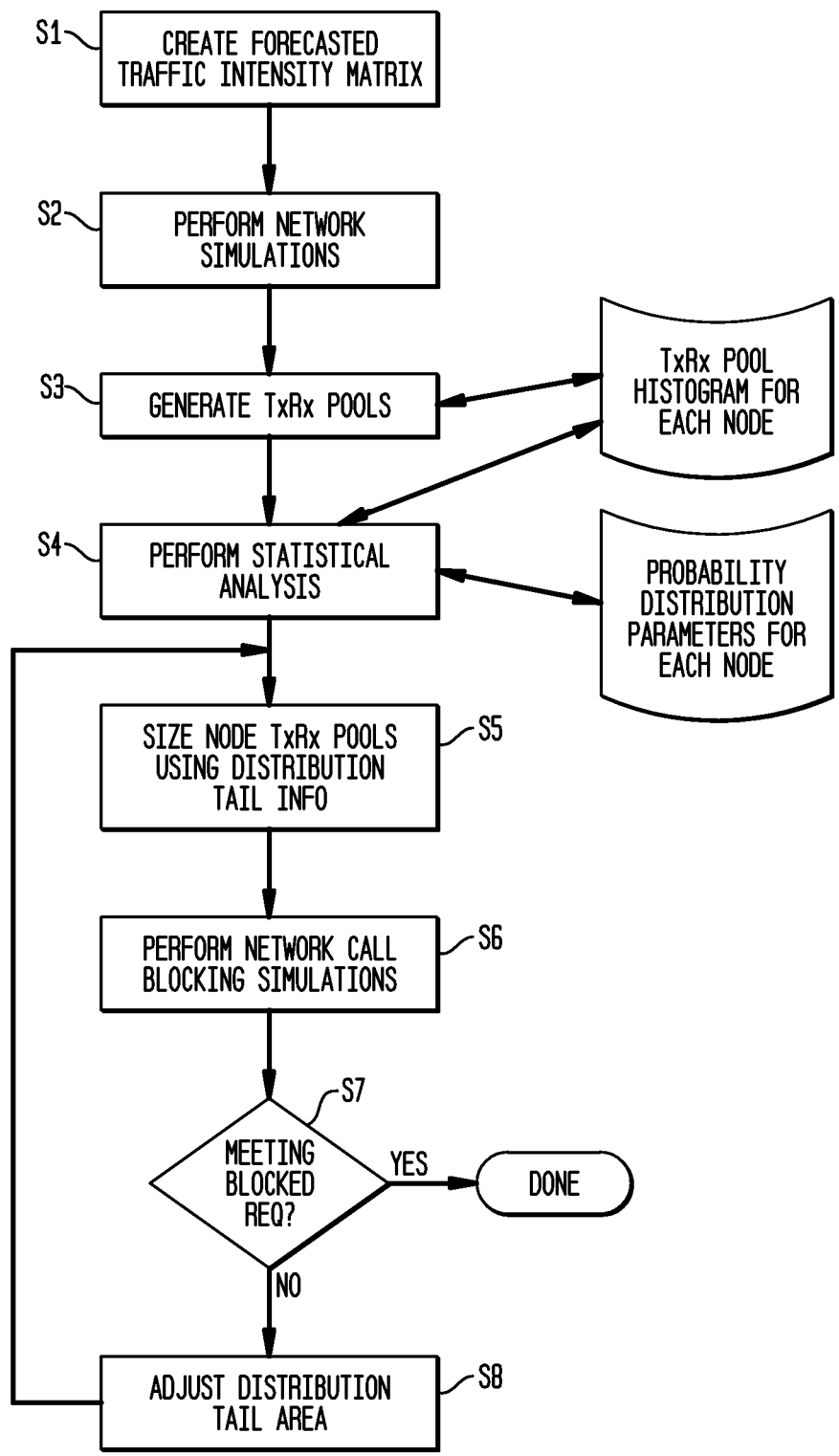
FIG. 3 is a flow diagram of the inventive transponder pool sizing methodology.

The methodology for sizing the shared WDM transponder pools, illustrated in FIG. 3, is a focus of the present invention.

FIG. 3 is a flow diagram of the inventive transponder pool sizing methodology. In step S1, a forecasted Traffic Intensity Matrix (TIM) is obtained or created. The TIM is an N×N symmetric matrix, where N is the number of nodes in the optical network that support optical wavelength service add/drop. The (i,j) entry in the TIM gives the traffic intensity between nodes and j. If there are different service classes (e.g., single, double, quadruple wavelength connections), then each service class will have its own TIM. The TIM drives the Network Simulation, which is performed in step S2. The Network Simulation simulates optical connection call arrivals/departures, routing of optical connections, determining what wavelengths, wavelength converters, regeneration, etc., are used. In particular, the Simulation can determine for each connection where and how transponders are used, and can keep track of how many transponders are in use at each network node. The Simulation can also keep track of successful calls and blocked calls, so the Simulation can report on call blocking statistics, such as what fraction of calls are blocked due to insufficient wavelength capacity, insufficient transponders, etc.

One of the functions the Simulation performs is to take independent samples of the number of transponders in use at each node that supports a shared transponder pool. This capability allows transponder pool histograms to be generated for each node having a transponder pool, and these are stored in step S3. These histograms are determined by putting a large number of transponders, e.g., 1,000, in each transponder pool, so there is never any blocking due to insufficient transponders. Then at widely spaced times, so the samples taken are independent, the number of transponders in use at each node supporting a transponder pool is recorded. The collection of samples for a node provides the histogram for that node.

In step S4, each transponder pool histogram is input to a Statistical Analysis function that determines the probability distribution and the distribution parameters (mean, variance, and degrees of freedom) for each node having a transponder pool. These parameters 22 are stored during step S4. One of our key findings is that the histograms for transponder pools all have a probability distribution belonging to the Chi-Squared distribution family. This is a one parameter distribution family, and the parameter is called the "degrees of freedom." The statistical analysis mentioned above determines the best matching degree of freedom for each histogram, and it does a validity check that confirms that the histogram matches the Chi-Squared distribution with the determined degrees of freedom.

As indicated above, we have discovered that for any specific network and TIM combination, each transponder pool histogram will have a predictable probability distribution, and the distribution belongs to the Chi-Squared distribution family illustrated in FIG. 4. To get statistical stability in a histogram, it is useful to combine samples from separate simulation runs using different simulation seeds. FIG. 4 shows five functions, each with a different distribution parameter or degree of freedom (k=1, 2, 3, 4, 5).

The results of a statistical analysis are illustrated in FIG. 5. In one embodiment, NIST Dataplot software can be used to do the statistical analysis. The graph on the left in FIG. 5 shows a histogram for a node. The graph in the center of FIG. 5 shows a Chi-Squared Probability Plot Correlation Coefficient (PPCC) Plot. This indicates which Chi-Squared degrees of freedom parameter value appears to have the best fit. To graphically check the fit of the Chi-Squared Probability Plot illustrated in FIG. 5, the graph on the right (Chi-Squared Probability Plot for k=5) is used. This is essentially a plot of the cumulative distribution of the standard Chi-Squared distribution for the assumed degrees of freedom parameter value on the horizontal axis, and the cumulative distribution of the histogram data on the vertical axis. A linear plot means the data is a good fit to the hypothesized Chi-Squared distribution.

Referring back to FIG. 3, the sizing of the transponder pools in each node is performed in step S5. Assume the network is being sized to meet a particular call blocking requirement, such as a $10^{-3}$ average blocking probability. There are two cases that can be considered.

Case 1 is when the call blocking is dominated by the wavelength availability. That is, assuming there are an unlimited number of transponders available, the blocking due to wavelength congestion would be close to the overall blocking objective, for example, $5 \times 10^{-4}$. In this case, the call blocking caused by transponders (or lack thereof) needs to be kept small enough so that the total blocking meets the $10^{-3}$ objective. So, a reasonable strategy would be to keep the transponder related call blocking close to around $10^{-4}$.

Case 2 is when the wavelength related blocking is very small, for example, $10^{-6}$. In that situation the transponder related blocking can be larger and close to the $10^{-3}$ objective, such as around $5 \times 10^{-4}$.

In either case, the transponder related blocking needs to be kept relatively small. FIG. 6 illustrates how the transponder pool sizes are determined. In one embodiment, the transponder pool blocking probability will be approximately equal to the area of the distribution tail ("tail area") beyond the chosen pool size. This is illustrated by Item 1 in FIG. 6. Item 2 in FIG. 6 illustrates that the distance A from the mean to the start of a tail area of $10^{-4}$ varies considerably depending on the Chi- Squared degrees of freedom. Therefore, it is very important to know accurately the Chi-Squared degrees of freedom of each transponder pool. Our simulation studies have shown that using the tail area as discussed above gives very accurate estimates of the call blocking probability.

Returning to FIG. 3, in step S5 transponder pool sizing is performed using the distribution tail information, e.g., tail area, discussed above. In step S6 simulations are run to check the overall call blocking probabilities. The call blocking probabilities are examined in step S7. If the overall blocking probabilities meet the requirements (S7=YES), the planning process is completed. If the blocking requirements are not being met (S7=NO), then the target tail area is adjusted in step S8, and the process goes back to step S5. This process continues until blocking requirements are met, that is, until S7=YES.

In another embodiment, in step S7, instead of or in addition to checking the whether the blocking probabilities meet the requirement, one can check whether the blocking requirements are too small, e.g., too many transponders are being used.

Figure 7:
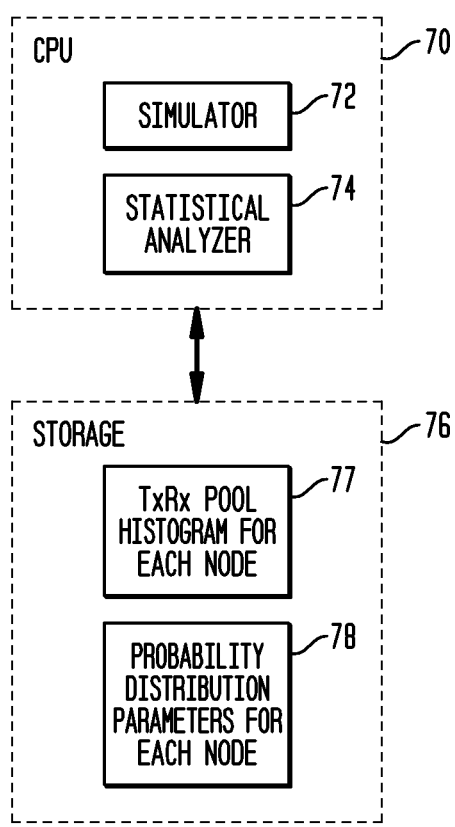
FIG. 7 is a schematic diagram of components in the inventive system.

FIG. 7 is a schematic diagram of components of the inventive system. As shown in FIG. 7, in one embodiment the system can comprise a CPU 70 having storage, memory, input devices, output devices, etc. The CPU 70 can process software modules including the network simulation 72 and the statistical analysis 74. These modules 72, 74 can reside in the CPU or can be loaded at execution time. The system can have integrated or separate storage devices. FIG. 7 shows a storage device 76 which is separate from the CPU. This storage device can store a database or file containing a TxRx Pool Histogram for each node 77 and a database or file containing probability distribution parameters for each node 78 computed by the statistical analysis module 74. Other hardware and software configurations known to those skilled in the art are possible.

Our inventive technology advantageously incorporates our discovery of the fact that all node transponder pool histograms have a known, identifiable distribution family, namely the Chi-Squared family. If each node had a different probability distribution that could not be identified as coming from a specific distribution family, then extensive, very long simulations would be required to be able to accurately characterize each node's distribution tail and determine the point beyond which the distribution had some small area (e.g., $10^{-4}$). However, knowing that all of the node distributions come from the Chi-Squared family means that only simulations to the extent that we can accurately know the Chi-Squared degrees of freedom of each histogram distribution are necessary. The tail areas can then be easily determined from the histogram mean, standard deviation, and Chi-Squared degrees of freedom.

It has been shown that the cost of transponders can be about sixty-three percent of the total cost of an optical network. The present invention advantageously provides cost savings in dynamic optical networks by accurately sizing the transponder pools and thus the number of transponders needed in an optical network.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for sizing one or more transponder pools in a dynamic wavelength division multiplexing optical network having a plurality of nodes, each transponder pool associated with an associated node of the network, comprising steps of:
    performing network simulations;
    generating transponder pool histograms for each associated node based on the network simulations;
    performing statistical analysis using the transponder pool histograms to verify probability distribution is from Chi-Squared family, to determine probability distribution parameters for each associated node and to calculate where, on the horizontal axis of the probability distribution, a tail area of a desired blocking starts;
    sizing the transponder pools in accordance with where the desired distribution tail area starts;

executing network call blocking simulations to determine call blocking probabilities;

determining whether the call blocking probabilities meet blocking requirements;

when the blocking requirements are met, using the sized transponder pools; and when the blocking requirements are not met, adjusting where the desired distribution tail area starts and repeating the steps of sizing the transponder pools, executing the network call blocking simulations and determining whether the call blocking probabilities meet the blocking requirements.

2. The method according to claim 1, wherein the distribution parameters comprise mean, variance and Chi-Squared degrees of freedom.

3. The method according to claim 1, wherein the step of performing network simulations is done by performing a plurality of separate simulation runs performed with different simulation seeds.

4. The method according to claim 1, wherein the step of performing network simulations comprises one or more of simulation of optical connection call arrivals/departures, routing of optical connections, determining wavelengths, determining wavelength converters, and determining regeneration.

5. The method according to claim 1, wherein the transponder pools comprise a number of transponders enabling the transponder pool to have at least one transponder during any simulation, the number depending at least on network design and network load.

6. A system for sizing one or more transponder pools in a dynamic wavelength division multiplexing optical network having a plurality of nodes, each transponder pool associated with an associated node of the network, comprising:

a CPU performing network simulations;

a module operable to generate transponder pool histograms for each associated node based on the network simulations, to perform statistical analysis using the transponder pool histograms to verify probability distribution is from Chi-Squared family, to determine probability distribution parameters for each associated node and to calculate where, on the horizontal axis of the probability distribution, a tail area of a desired blocking starts, to size the transponder pools in accordance with where the desired distribution tail area starts, to execute network call blocking simulations to determine call blocking probabilities, and to determine whether the call blocking probabilities meet blocking requirements, wherein when the blocking requirements are met, using the sized transponder pools and when the blocking requirements are not met, adjusting where the desired distribution tail area starts and repeating the steps of sizing the transponder pools, executing the network call blocking simulations and determining whether the call blocking probabilities meet the blocking requirements.

7. The system according to claim 6, wherein the distribution parameters comprise mean, variance and Chi-Squared degrees of freedom.

8. The system according to claim 6, wherein the network simulations are performed using plurality of separate simulation runs performed with different simulation seeds.

9. The system according to claim 6, wherein performing network simulations comprises one or more of simulation of optical connection call arrivals/departures, routing of optical connections, determining wavelengths, determining wavelength converters, and determining regeneration.

10. The system according to claim 6, wherein the transponder pools comprise a number of transponders enabling the transponder pool to have at least one transponder during any simulation, the number depending at least on network design and network load.

11. A computer readable non-transitory storage medium storing a program of instructions executable by a machine to perform a method for sizing one or more transponder pools in a dynamic wavelength division multiplexing optical network having a plurality of nodes, each transponder pool associated with an associated node of the network, comprising:

performing network simulations;

generating transponder pool histograms for each associated node based on the network simulations;

performing statistical analysis using the transponder pool histograms to verify probability distribution is from Chi-Squared family, to determine probability distribution parameters for each associated node and to calculate where, on the horizontal axis of the probability distribution, a tail area of a desired blocking starts;

sizing the transponder pools in accordance with where the desired distribution tail area starts;

executing network call blocking simulations to determine call blocking probabilities;

determining whether the call blocking probabilities meet blocking requirements;

when the blocking requirements are met, using the sized transponder pools; and when the blocking requirements are not met, adjusting where the desired distribution tail area starts and repeating the steps of sizing the transponder pools, executing the network call blocking simulations and determining whether the call blocking probabilities meet the blocking requirements.

12. The computer readable non-transitory medium according to claim 1, wherein the distribution parameters comprise mean, variance and Chi-Squared degrees of freedom.

13. The computer readable non-transitory medium according to claim 11, wherein performing network simulations is done by performing a plurality of separate simulation runs performed with different simulation seeds.

14. The computer readable non-transitory medium according to claim 11, wherein performing network simulations comprises one or more of simulation of optical connection call arrivals/departures, routing of optical connections, determining wavelengths, determining wavelength converters, and determining regeneration.

15. The computer readable non-transitory medium according to claim 11, wherein the transponder pools comprise a number of transponders enabling the transponder pool to have at least one transponder during any simulation, the number depending at least on network design and network load.

* * * * *